United States Patent
Tov

(10) Patent No.: US 10,269,023 B1
(45) Date of Patent: Apr. 23, 2019

(54) PROFILE-BASED SYSTEM, METHOD AND COMPUTER PROGRAM PRODUCT FOR PROVIDING ADVERTISEMENTS WITH A PLURALITY OF INVOICES

(75) Inventor: Nir Shem Tov, Ganei-Tikva (IL)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 2187 days.

(21) Appl. No.: 11/478,918

(22) Filed: Jun. 30, 2006

(51) Int. Cl.
*G06Q 30/02* (2012.01)

(52) U.S. Cl.
CPC ......... *G06Q 30/02* (2013.01); *G06Q 30/0215* (2013.01); *G06Q 30/0255* (2013.01)

(58) Field of Classification Search
CPC . G06Q 30/02; G06Q 30/0215; G06Q 30/0255
USPC .......................................................... 705/14
See application file for complete search history.

(56) References Cited

U.S. PATENT DOCUMENTS

| | | | |
|---|---|---|---|
| 2001/0023408 A1* | 9/2001 | Mc.Evoy et al. | 705/14 |
| 2002/0056118 A1* | 5/2002 | Hunter et al. | 725/87 |
| 2002/0095333 A1* | 7/2002 | Jokinen et al. | 705/14 |
| 2002/0144262 A1* | 10/2002 | Plotnick et al. | 725/32 |
| 2003/0004872 A1* | 1/2003 | Gardi | G06Q 20/102 705/40 |
| 2003/0037041 A1* | 2/2003 | Hertz | 707/1 |
| 2003/0110128 A1* | 6/2003 | Foth et al. | 705/40 |
| 2003/0154475 A1* | 8/2003 | Rodriguez | G06Q 30/0242 725/32 |
| 2003/0233278 A1* | 12/2003 | Marshall | 705/14 |
| 2004/0215508 A1* | 10/2004 | Rebenack | G06Q 20/102 705/14.67 |
| 2004/0249709 A1 | 12/2004 | Donovan et al. | 705/14 |
| 2005/0049971 A1* | 3/2005 | Bettinger | 705/51 |
| 2005/0119936 A1* | 6/2005 | Buchanan et al. | 705/14 |
| 2005/0215238 A1* | 9/2005 | Macaluso | G06Q 30/02 455/414.1 |
| 2006/0004631 A1* | 1/2006 | Roberts | G06Q 30/02 705/14.57 |
| 2006/0026067 A1* | 2/2006 | Nicholas et al. | 705/14 |
| 2006/0229940 A1* | 10/2006 | Grossman | 705/14 |
| 2007/0060109 A1* | 3/2007 | Ramer et al. | 455/414.1 |

OTHER PUBLICATIONS

Kern, Jackie: A Look Inside Statement Insert Programs, May 31, 2006. Published by Tech Marketing, available at https://www.targetmarketingmag.com/article/a-look-inside-statement-insert-programs-26878/all/ (Year: 2006).*
Hardata Global Media Solutions, "TrafficSat STD" http://www.hardata.com/traffic.asp pp. 1-4.
Tecnavia, "News Memory" www.newsmemory.com pp. 1-5.

* cited by examiner

*Primary Examiner* — Katherine Kolosowski-Gager
(74) *Attorney, Agent, or Firm* — Zilka-Kotab, P.C.

(57) ABSTRACT

A system, method and computer program product are provided for profile-based advertising. In use, profile criteria is identified. A subset of customers to which invoices are to be delivered is then determined, based on the profile criteria. In addition, at least one advertisement is included with the invoices delivered to the subset of customers.

7 Claims, 6 Drawing Sheets

PROFILE-BASED SYSTEM, METHOD AND COMPUTER PROGRAM PRODUCT FOR PROVIDING ADVERTISEMENTS WITH A PLURALITY OF INVOICES

FIELD OF THE INVENTION

The present invention relates to advertisement frameworks, and more particularly to techniques for targeted advertising.

BACKGROUND

Generally, advertisements are utilized by advertisers to distribute information to the general public. Traditionally, advertisements are distributed through the mail or broadcasted utilizing radio and/or television. Such advertisements are usually provided in the form of fliers and commercials, respectively. With the emergence of the Internet, advertisers have been able to expand their advertising to Internet subscribers by utilizing banner advertisements, pop-up advertisements, embedded text advertisements, unsolicited electronic mail advertisements, etc.

However, current forms of advertising are commonly required to be distributed to a broadly defined intended audience. For example, mail-based and broadcast-based advertisements are usually targeted to a specified geographic area (e.g. zip code, city, etc.). As another example, Internet-based advertisements are usually targeted to viewers of specified web content. Thus, with advertisements transmitted in such a variety of general ways, it is sometimes difficult for advertisers to target specific customers in an effective manner.

There is thus a need for overcoming these and/or other problems associated with the prior art.

SUMMARY

A system, method and computer program product are provided for profile-based advertising. In use, profile criteria is identified. A subset of customers to which invoices are to be delivered is then determined, based on the profile criteria. In addition, at least one advertisement is included with the invoices delivered to the subset of customers.

DETAILED DESCRIPTION

Figure 1:
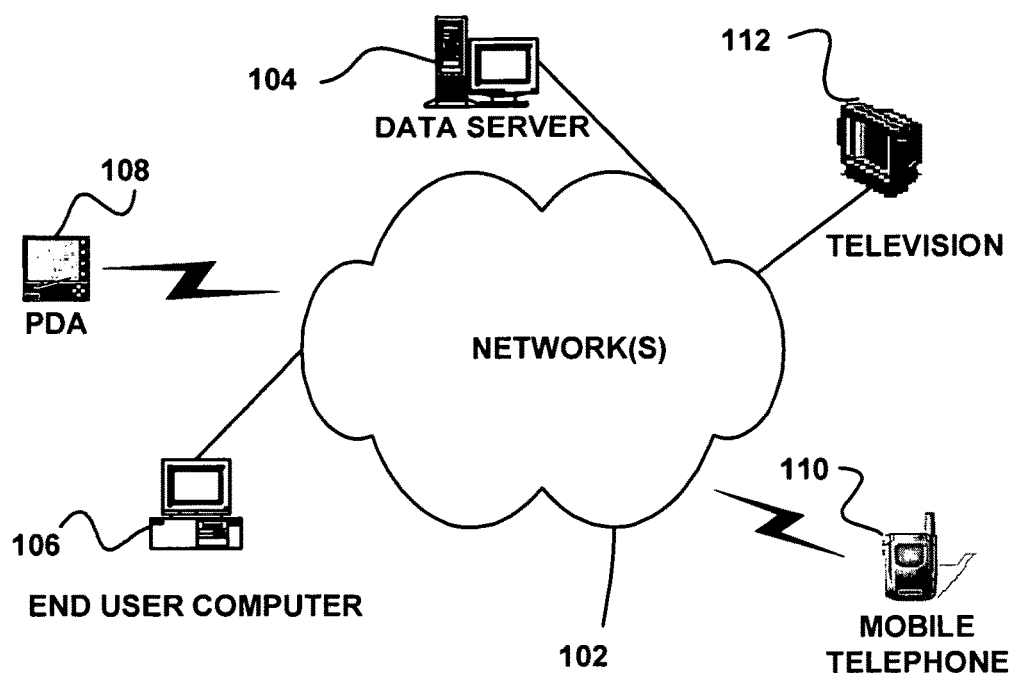
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
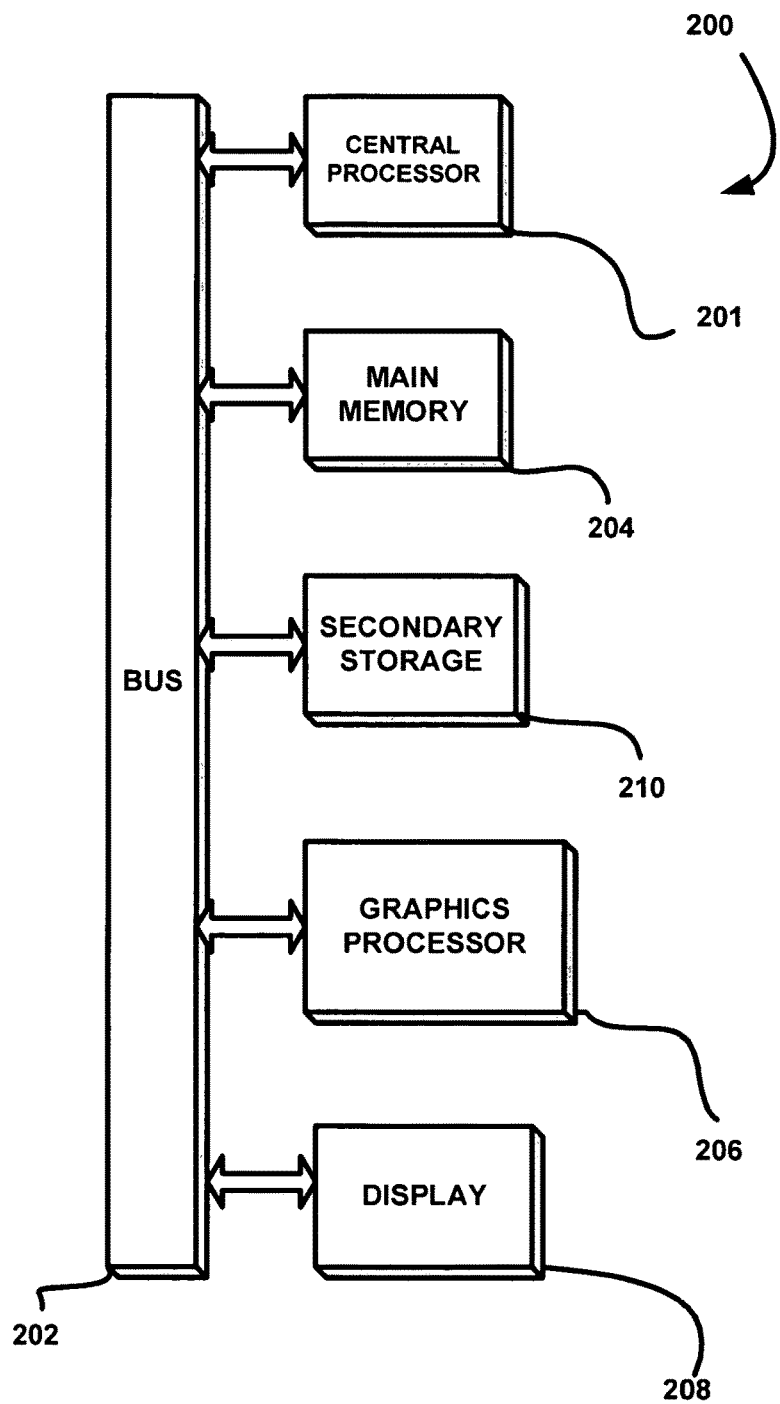
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 600 to perform various functions. Memory 204, storage 210 and/or any other storage are possible examples of computer-readable media.

Figure 3:
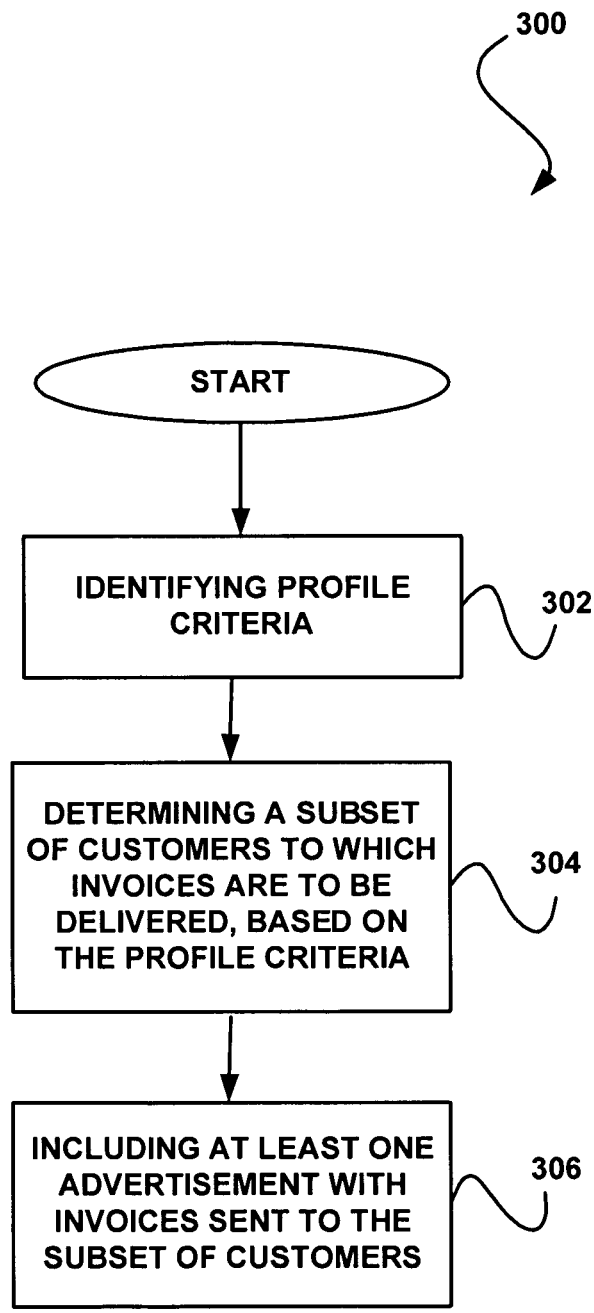
FIG. 3 shows a method for profile-based advertising utilizing invoices, in accordance with one embodiment.

FIG. 3 shows a method 300 for profile-based advertising utilizing invoices, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

As shown in operation 302, profile criteria is identified. In the context of the present description, the profile criteria may include any criteria capable of being associated with customers receiving at least one invoice. Such customers may include businesses, individuals, organizations, and/or any entity capable of receiving an invoice. In one optional embodiment, the profile criteria may be associated with a particular advertisement and/or category of advertisements. Of course, in other embodiments, the profile criteria may also be associated with all available advertisements. Such advertisements will be described in more detail with respect to operation 306.

Furthermore, in still other embodiments, the profile criteria may be associated with a single advertisers and/or a plurality of advertisers providing advertisements. For instance, such profile criteria may be selected by one or more advertisers in association with at least one advertisement for providing criteria on customers and/or types of customers to which the advertisement(s) should be delivered.

In one specific exemplary embodiment, the profile criteria may include a location of customers (e.g. a home address, business address, zip code, city, etc.). In addition, the profile criteria may include at least one preference of the customers. For instance, each customer may define preferences with respect to receiving advertisements such as, for example, categories of advertisements desired to be received, specific advertisements not to be received, all advertisements not to be received, all advertisements to be received, and/or any other preferences capable of being associated with advertisements and/or the customers. Thus, the profile criteria may specify customer preferences associated with the manner in which advertisements are to be delivered to associated customers.

Further, in other embodiments, the profile criteria may describe behavior of the customers. For instance, a business entity from which a customer receives an invoice may collect and/or analyze behavioral data of its customers. Specifically, the business entity may collect and/or analyze data associated with customers' interactions with goods and/or services provided by the business entity (e.g. types of goods/services purchased by the customers, actual use of goods/services by the customers, location of use of goods/services purchased by the customers, etc.). Thus, the profile criteria may specify customer behavior such that advertisements may be delivered to customers exhibiting a certain behavior. Still yet, the profile criteria may include a description of customers (e.g. demographic data, age data, sex data, etc.) to which the advertisements are to be delivered. In various embodiments, any portion of the aforementioned profile criteria may optionally take the form of metadata.

Based on the profile criteria identified in operation 302, a subset of customers to which invoices are to be delivered is determined, as shown in operation 304. In one embodiment, the invoices may include electronic-based invoices. Such electronic-based invoices may include electronic documents capable of being delivered to a customer utilizing a network in any desired form (e.g. web page, electronic mail, pushed content, etc.). As another option, the invoices may include paper-based invoices. For example, such paper-based invoices may include printed invoices delivered to customers by ground mail.

In one embodiment, the subset of customers may be determined based on a comparison of the profile criteria to a database of profiles of the customers. The profiles of the customers may include any data capable of being associated with customers. For example, for each customer, a profile may include a location of the customer, at least one preference of the customer, a behavior associated with the customer, etc. as described above with respect to operation 302. Thus, the subset of customers may include customers with associated profile data that matches, at least in part, the profile criteria. Of course, any business logic, etc. may be utilized to determine what constitutes such a match.

In another optional embodiment, the database of profiles of the customers may be generated based on metadata. In particular, the metadata may be received from at least one business entity providing a good and/or service to a customer (for which the invoice is issued). Such metadata may then be utilized to populate the database of profiles.

As yet another option, the subset of customers may be determined based on a predetermined limit. For example, a business entity distributing advertisements in association with invoices may specify a predetermined number of advertisements to be distributed. Thus, the subset of customers may be limited to the predetermined number of advertisements to be distributed.

As shown in operation 306, at least one advertisement may thus be included with invoices sent to the subset of customers. In the context of the present description, such advertisement may include any information relating to a product and/or service. In various embodiments, the advertisement may be an electronic-based advertisement included with electronic-based invoices, or a paper-based advertisement included with paper-based invoices. Of course, the aforementioned inclusion of the advertisement may involve an advertisement integrated with the invoice and/or a separate, but associated electronic and/or paper advertisement (e.g. two separate associated electronic mails, a separate physical invoice and advertisement mailed in a single envelope, an electronic mail invoice including a link to the advertisement, etc.).

In this way, advertisements may be distributed to customers in association with invoices delivered to the customers. Furthermore, such advertisements may be distributed based on profiles of the customers that match predefined profile criteria associated with the advertisements. Thus, an efficient profile-based method 300 of distributing advertisements may be provided.

More illustrative information will now be set forth regarding various optional architectures and uses in which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
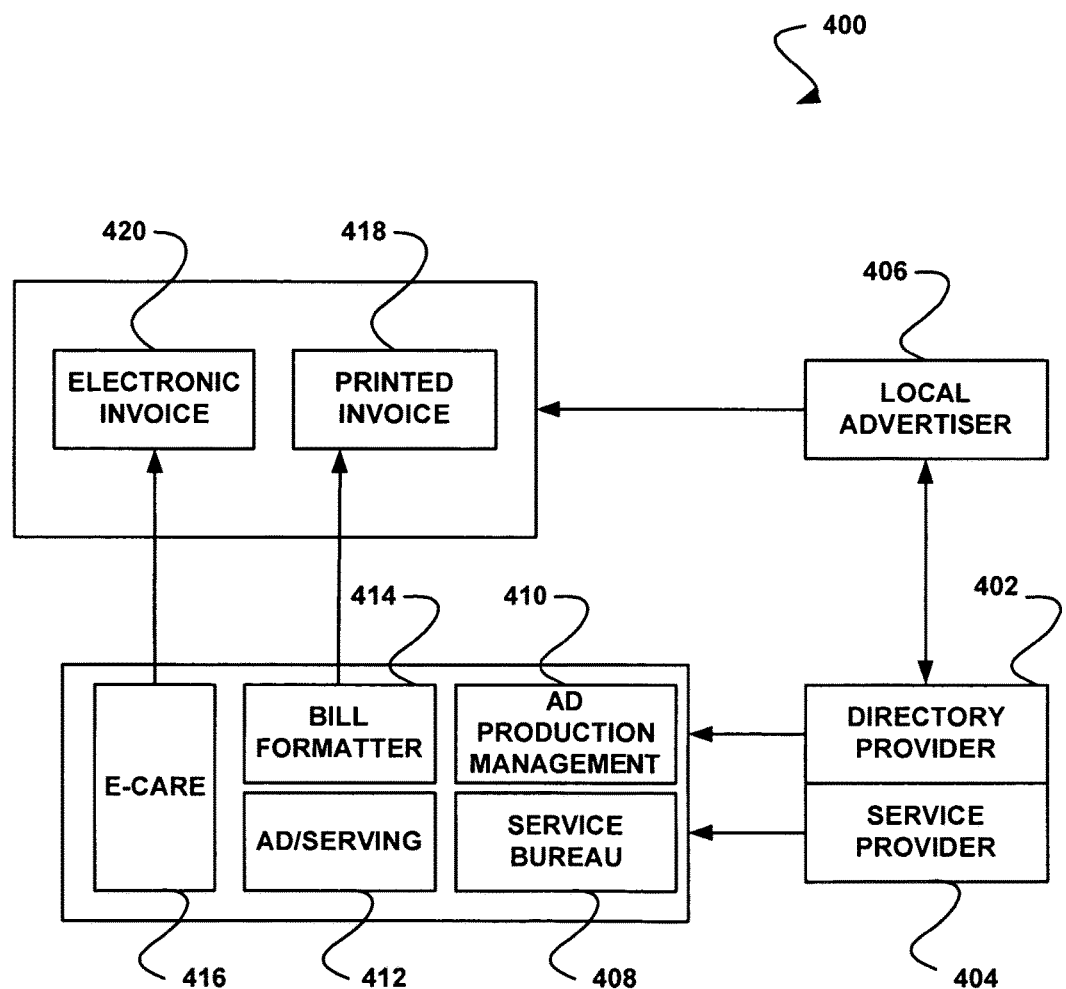
FIG. 4 shows a system for profile-based advertising utilizing invoices, in accordance with another embodiment.

FIG. 4 shows a system 400 for profile-based advertising utilizing invoices, in accordance with another embodiment. As an option, the system 400 may be implemented in the context of the details of FIGS. 1-3. Of course, however, the system 400 may be carried out in any desired environment. Again, the aforementioned definitions may equally apply to the description below.

As shown, a directory provider 402 that defines a product and/or service advertisement communicates such advertisement to a local advertiser 406. The directory provider may include any entity that provides directory information and/or advertisements. For example, the directory provider 402 may include Yellow Pages, etc. The defined advertisement may include a blank advertisement, a generic advertisement for a particular good and/or service, a banner advertisement, a coupon, etc.

Of course, the defined advertisement may include any type of advertisement information capable of describing the available advertisement to the local advertiser 406 which may purchase the same. As an option, the directory provider 402 may also define advertisement pricing, a target population of the advertisement, a representative of the directory provider 402 responsible for communicating the advertisement, business entities targeted to purchase the advertisement and/or any other information capable of being associated with the advertisement. To this end, the directory provider 402 may sell the advertisement to the local advertiser 406.

Furthermore, the directory provider 402 may optionally enable budget control for the local advertiser 406. For example, the directory provider 402 may limit distribution of the advertisement based on a budget of the local advertiser 406. The directory provider 402 may also manage advertisement inventory (e.g. advertisements defined by the directory provider 402 along with yield management parameters associated with such defined advertisements, etc.). In this way, the directory provider 402 may define a catalog of advertisements for purchase by advertisers. Additionally, the directory provider 402 may sell such advertisements in their defined form, as part of a bundle of advertisements, as a regular print advertisement, and/or in any other desired manner.

Once the advertiser 406 selects an advertisement, an advertisement production management system 410 may create the actual advertisement. Optionally, the advertisement production management system 410 may create the advertisement according to specifications issued by the local advertiser 406. For example, the local advertiser 406 may specify data to be included in the advertisement (e.g. a business address and/or business name associated with the local advertiser 406, etc.), a logo to be included in the advertisement, at least one service provider 404 to distribute the advertisement, predefined or advertiser-configured profile criteria for determining customers to which the advertisement is to be distributed, at least one category of the advertisement, etc. Of course, such data may be specified by any desired entity involving the advertiser 406 or not.

The created advertisement may be in any format and/or in multiple formats. For instance, the created advertisement may be formatted to coincide with the media that will be used to distribute the advertisement. In particular, if the advertisement will be distributed over the Internet, the format of the advertisement may be a graphic interchange format (GIF). As another option, if the advertisement will be distributed utilizing Internet Protocol Television (IPTV), the format of the advertisement may be a flash format. As yet another option, if the advertisement will be distributed utilizing a Short Message Service (SMS), the format of the advertisement may be a text format. Of course, any format may be utilized that is capable of facilitating appropriate distribution of the advertisement.

A service bureau 408 may then identify customer profiles associated with the service provider 404 that is to distribute the advertisement. The service provider 404 may include any business entity, individual, etc. capable of providing a good and/or service to customers along with invoices for such good and/or service. Such customer profiles may optionally be received from the service provider 404 utilizing an application program interface. Specifically, the customer profiles may include data associated with customers of the service provider 404. As described above with respect to the method 300 of FIG. 3, such data may include a location of the customer, a description of the customer, preferences of the customer, behavioral history of the customer, and/or any other data capable of being associated with the customer.

As shown, an optional e-care system 416 may be provided for receiving the preferences of the customer. In particular, the e-care system 416 may include a self-service portal (e.g. television portal, mobile device portal, Internet portal, etc.) where customers may define their preferences for receiving advertisements. In one optional embodiment, the e-care system 416 may include a system utilized by the service provider 404 to communicate with customers. For instance, the e-care system 416 may be utilized by the service provider 404 to distribute electronic-based invoices to customers such as, for example, by utilizing customer accounts, etc.

An ad/serving system 412 may then utilize profile criteria, such as that described above in the context of the method 300 of FIG. 3, for determining a subset of customers to which the advertisement is to be delivered. The subset of customers may be determined by matching the profile criteria to a database of the customer profiles. As described above, such database of customer profiles may optionally be populated with information collected by the service provider 404 associated with such customers. Thus, the ad/serving system 412 (which may or may not be separate from the service provider 404) may be utilized to determine the subset of customers. Of course, the subset of customers may be determined in any desired manner.

In this way, at least one advertisement with associated profile criteria that matches at least one customer profile may be identified, thus enabling the same advertisement or different advertisements to be delivered to the corresponding customer(s) of the service provider 404. As an option, a predefined number of advertisements may be matched to each customer, thus limiting a number of advertisements matched to each customer. In addition, a history of matches may be identified such that a customer may only be matched with a particular advertisement a predetermined number of times.

Advertisements with matching customer profiles associated with the service provider 404 may then be sent to the service provider 404 utilizing a network (or in any other desired manner). In addition, data associated with such advertisements, such as metadata, may be sent with the advertisements. Such data may include any data associated with the customer profiles. Specifically, in one embodiment, the data may include a mapping that identifies each customer and the customer's associated matching advertisement(s).

Using such data, the service provider 404 may then provide matching advertisements to appropriate customers utilizing an electronic invoice 420 and/or a printed invoice 418 delivered from the service provider 404 to its customers. Optionally, the service provider 404 may embed each matching advertisement into the electronic invoice 420 and/or the printed invoice 418 utilizing a bill formatter 414 (e.g. by utilizing a banner, a pop-up, etc.). As another option, the service provider 404 may attach the matching advertisement to the electronic invoice 420 and/or printed invoice 418. Of course, the service provider 404 may distribute the matching advertisement in any desired manner utilizing an invoice. In this way, the matching advertisements may be distributed utilizing a network, ground mail, etc.

Additionally, the directory provider 402 and/or advertiser 406 may be charged for each advertisement that is distributed by the service provider 404 to its customers and/or interacted with by such customers. Still yet, the service provider 404 may be credited for each advertisement distributed to its customers.

By this design, distribution of advertisements associated with an advertiser may be guaranteed by associating such advertisements with customer invoices. Furthermore, advertisements may be targeted at customers within a local advertiser's geographic area that may also match additional profile criteria while taking into account customer preferences, etc. Still yet, the directory provider 402 sales channel opportunities may further be combined with the broad customer bases of multiple service providers 404, thus creating a vast advertising network.

As yet another option, at least one aspect of each advertisement may be tracked. Result data from such tracking may be reported to the local advertiser 406. The result data may include information regarding advertisements associated with the local advertiser 406 that were sent to service providers 404 and/or distributed to customers. The result data may also describe customer interaction with an advertisement. For instance, the result data may include information associated with a customer clicking on one of a plurality of categories included in an electronic advertisement, where such clicking provides, for example, additional information associated with the advertisement.

In this way, reports may be sent to the advertiser 406 regarding advertisement distribution. In addition, such reports may be sent to the advertiser 406 utilizing the ad/serving system 412. Optionally, the advertiser 406 may be charged based on any user interaction with associated advertisements.

Furthermore, a personal advertisement repository (not shown) may be utilized to stored advertisements according to customer. Specifically, the repository may aggregate and store advertisements previously distributed to each customer. Such advertisement may optionally be stored such that data included in such advertisements is stored (e.g. business data, location data, etc.). Thus, the stored advertisements may be available for repeated presentment to customers.

The repository may also provide a reference to each advertiser for which an advertisement was received by a customer, such that any updated advertisement issued by the advertiser may be automatically stored in the repository for the associated customer. In particular, such updated advertisements may replace any advertisements for which the update was issued.

The repository may also include an accumulator for accumulating advertisements distributed to each customer. The accumulator may additionally organize the advertisements in a configurable structure. Still yet, the accumulator may be utilized to delete advertisements from the repository.

The repository may also include an organizer for organizing advertisements. For instance, the advertisements may be organized in a tree-based view and/or utilizing any other method capable of organizing data. Advertisements associated with each customer may be organized for each customer based on data associated with the advertisement (e.g. category, customer ranking of the advertisement, relevancy to the customer's immediate needs, etc.). Moreover, the advertisements may be reorganized by an associated customer.

Table 1 shows an example of categories associated with advertisements that may be utilized for organizing advertisements in a repository in a tree-based view. Of course, such example is set forth for illustration purposes only and should not be construed as limiting in any manner.

TABLE 2

Arts & Entertainment
   Art Galleries, CDs & Records, Movie Theaters, Nightclubs, . . .
Automotive
   Car Dealers, Car Parts, Car Repair, Truck Dealers, . . .
Business & Professional Services
   Copying Services, Employment Agencies, Labs, Office Supplies, . . .
Clothing & Accessories
   Clothing Stores, Jewelers, Shoe Stores, . . .
Community & Government
   Child Care, Churches, Government Offices, Post Offices, . . .
Computers & Electronics
   Computer Dealers, Internet Services, Televisions, . . .
Construction & Contractors
   Building Contractors, Construction Materials, Electricians, . . .
Education
   Colleges & Universities, Driver Training, Elementary Education, . . .
Food & Dining
   Coffee Shops, Grocery Stores, Liquor Stores, Restaurants Thus, for each advertisement received by a customer in association with an invoice, such advertisement may be stored in the repository for future presentment to the customer. In this way, the customer may be able to view such advertisements at the customer's discretion. Table 2 shows an example of how an advertisement may be stored in the repository for presentment to a customer. Again, such example is set forth for illustration purposes only and should not be construed as limiting in any manner.

TABLE 2

COMPANY ONE USA
100 Company Street
City, State 10101
(800) 212-1212

The repository may optionally include a mechanism for providing coupons associated with advertisements stored in the repository to relevant customers. Furthermore, the repository may include a trading center for allowing a customer to perform actions in association with an advertisement. For instance, the trading center may allow the customer to request additional information associated with an advertisement, to initiate communication with a representative of an advertiser associated with an advertisement, to purchase a product and/or service associated with an advertisement, etc.

Data associated with such customer actions may be sent directly to an associated advertiser and/or may be sent to an associated advertiser by way of a service bureau (e.g. see service bureau 408, etc.) As an option, advertisers may be charged for such functionality. Still yet, the repository may include a recommendation service whereby customers may input data (e.g. rankings, comments, etc.) associated with particular advertisements. Such input data may then be made available in association with any of such advertisements located in a customer's repository.

In one optional embodiment, the repositories may be provided to customers utilizing a billing interface (not shown). Such billing interface may further be associated with the directory provider 402. The billing interface may include, for example, the e-care system 412 described above. The billing interface may also provide customers with bargains, sales, discounts, recommendations and/or any other data capable of being associated with advertisements stored in customers' associated repositories. Such billing interface may also include a secure interface. Thus, any selection made by a customer that will transmit the customer outside of the secure interface may result in a notification presented to the customer.

Just by way of illustration, a directory provider sales representative may sell an advertisement to a local business desiring to advertise. The advertisement may include business details of the local business along with promotional text (e.g. coupon, etc.). The local business may customize the advertisement and provide profile criteria for types of persons and/or businesses the local business desires to target with the advertisement.

The advertisement may then be included with a service provider's bill delivered to customers of the service provider, where such customers have profiles matching the profile criteria specified by the local business. In addition, such advertisement that is delivered to the customers may be stored in a directory page specific for each customer that is provided by the directory provider. Such directory page may provide business details and a location associated with the local business.

Figure 5:
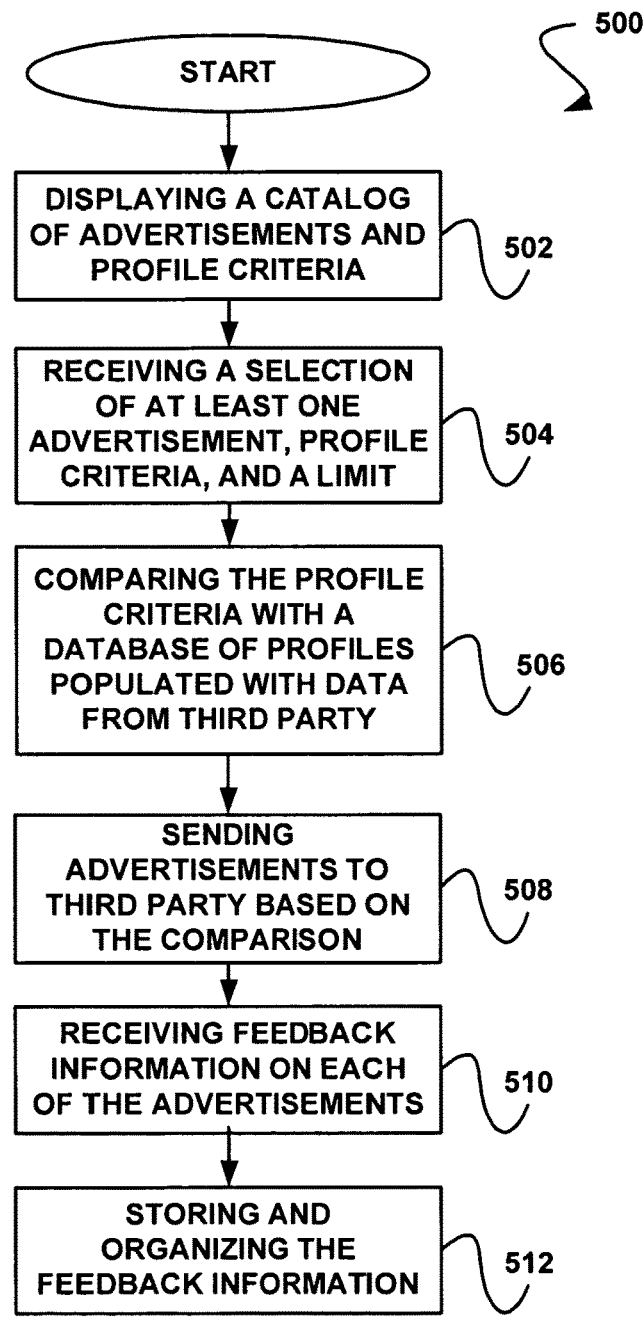
FIG. 5 shows a method for profile-based advertising, in accordance with yet another embodiment.

FIG. 5 shows a method 500 for profile-based advertising, in accordance with yet another embodiment. As an option, the method 500 may be implemented in the context of the details of FIGS. 1-4. Of course, however, the method 500 may be carried out in any desired environment. Again, the aforementioned definitions may equally apply to the description below.

As shown in operation 502, a catalog of advertisements and profile criteria are displayed. The catalog of advertisements may be displayed to an advertiser. Optionally, the advertisements in the catalog of advertisements may be organized based on input of the advertiser. The catalog of advertisements may include generic advertisements that may be customized according to needs of the advertiser. In addition, the criteria may include any characteristics capable of being associated with potential receivers of the advertisement.

A selection of at least one advertisement is received from the catalog of advertisements, along with profile criteria and a limit, as shown in operation 504. Thus, the advertiser may select any number of advertisements to which it desires to be associated. In addition, the advertiser may also select profile criteria that specifies types of receivers of the advertisement. In this way, an advertiser may customize to whom a particular advertisement is distributed. Further, the advertiser may specify the limit for limiting a number (and thus the cost) of advertisements distributed to receivers.

In operation 506, the profile criteria is compared to a database of profiles that have been populated with data from a third party. For instance, the database of profiles may include profiles of customers associated with the third party, where the third party has provided or currently provides a good and/or service to such customers. In addition, the profiles may include any data capable of being associated with businesses and/or individuals associated with the third party. Specifically, the profiles may include data capable of being compared to profile criteria capable of being associated with an advertisement, such as that described above with respect to operation 502.

Based on the comparison of operation 506, advertisements may be sent to the third party. Note operation 508. For example, for profiles in the database of profiles that match profile criteria associated with an advertisement, such advertisement may be sent to receivers associated with such profiles. The advertisements may be sent to the third party such that the third party may distribute the advertisements to the appropriate receivers.

Once the advertisements have been distributed to the appropriate receivers, feedback information associated with each advertisement is received, as shown in operation 510. The feedback information may be received from the third party with respect to actual advertisements that were distributed to receivers. Of course, the feedback information may also be received from the receivers of the advertisements, where such feedback information includes any type of feedback data associated with the advertisement.

Moreover, the received feedback information from operation 510 may be stored and organized, as in operation 512. For instance, the received feedback may be stored in a database of feedback. As another option, the received feedback may be stored in association with the advertisements in the catalog of advertisements. Of course, the feedback information may be stored in any desired manner.

Still yet, the feedback information may be organized according to customer, category of advertisement, specific advertisement, advertiser, etc. In this way, an advertiser may target specific types of customers to receive a particular advertisement utilizing a third party, and feedback on such advertisements may be stored for use by the advertiser and/or any other advertisers, the third party and/or any receivers of the advertisement.

Figure 6:
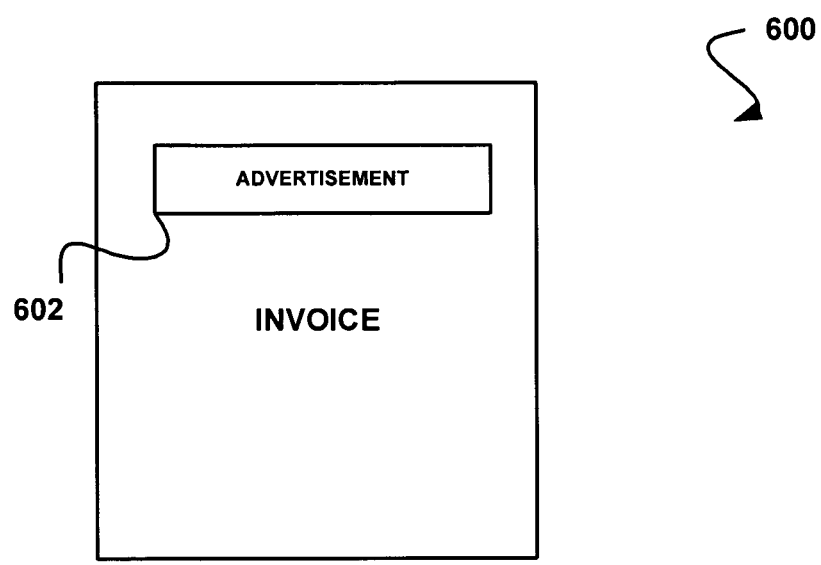
FIG. 6 shows an invoice utilized for profile-based advertising, in accordance with still yet another embodiment.

FIG. 6 shows an invoice 600 utilized for profile-based advertising, in accordance with still yet another embodiment. As an option, the invoice 600 may be implemented in the context of the details of FIGS. 1-5. Of course, however, the invoice 600 may be carried out in any desired environment. Again, the aforementioned definitions may equally apply to the description below.

The invoice 600 may include a paper-based invoice (e.g. printed and mailed invoice) or an electronic-based invoice (e.g. electronic document invoice available utilizing a network). As shown, the invoice 600 may include an advertisement 602 embedded within the invoice 600. Such advertisement 602 may be particular to a profile of a receiver of the invoice. Thus, the advertisement 602 may be targeted to the receiver of the invoice based on criteria specified by an advertiser associated with the advertisement 602.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying, by a system, profile criteria specified for each of a plurality of advertisements, where the profile criteria describes customers to which the plurality of advertisements are to be delivered, and where the profile criteria includes:
   a location of use of at least one of a previously purchased good and service,
   a physical location,
   a predefined preference indicating a desire to receive one or more categories of advertisements and a desire to not receive one or more categories of advertisements, and
   a demographic, an age, and a sex;
   identifying, by the system, additional information specified for each of the plurality of advertisements, the additional information including:
   data to be included in the advertisement, and
   at least one service provider to distribute the advertisement;
   creating, by the system, each of the advertisements according to the profile criteria and additional information specified for the advertisement, the advertisement being created in a format coinciding with a media to be used by the at least one service provider to distribute the advertisement;
   identifying, by the system, a plurality of customers to which an electronic invoice for a good or service is to be delivered;
   determining, by the system, a subset of the plurality of customers by comparing the profile criteria of each of the plurality of advertisements to a database of customer profiles associated with the plurality of customers where the subset of the plurality of customers includes customers with associated customer profiles that match each of the profile criteria, and where the subset of the plurality of customers is limited to a predetermined number of advertisements to be distributed specified by a business entity distributing advertisements in association with invoices; and
   for each of the customers in the subset:
   including, by the system, the plurality of advertisements with the electronic invoice to be delivered to the customer, where each of the plurality of advertisements is electronic and includes a plurality of categories for selection by the customer, delivering, by a billing interface of the system, the electronic invoice and the included plurality of advertisements to the customer, tracking, by the system, an interaction with the included plurality of advertisements by the customer, and reporting, by the system, result data to an advertiser associated with the included plurality of advertisements, the result data including information regarding the included plurality of advertisements and the tracked interaction;

storing, by the system in a personal advertisement repository, the plurality of advertisements delivered to the customers, the advertisements being stored according to customer such that each of the advertisements is stored in the personal advertisement repository in association with each of the customers to which the advertisement was delivered;

providing, in the personal advertisement repository, a reference to an advertiser for each of the advertisements stored therein for automatically replacing, by the system, each of the advertisements stored in the personal advertisement repository with a corresponding updated advertisement when received from the referenced advertiser; and for each of the customers, creating, by the system, a directory page specific to the customer for repeated presentment thereof, the directory page including the advertisements stored in a respective personal advertisement repository according to the customer by category;

for each of the customers, providing, by the system and via the billing interface of the system, a respective directory page specific to the customer, and responsive to selection by the customer of one or more of the advertisements through the directory page, providing the selected one or more advertisements to the customer for viewing thereof.

2. The method of claim 1, wherein the advertisements are organized in a catalog based on input of the advertiser.

3. The method of claim 1, wherein the database of profiles is populated with information collected from a business entity, where the business entity is separate from an ad/serving system which performs the determining.

4. A computer program product embodied on a non-transitory computer readable medium executed by a processor, comprising:

computer code for identifying, by a system, profile criteria specified for each of a plurality of advertisements, where the profile criteria describes customers to which the plurality of advertisements are to be delivered, and where the profile criteria includes:

a location of use of at least one of a previously purchased good and service, a physical location, a predefined preference indicating a desire to receive one or more categories of advertisements and a desire to not receive one or more categories of advertisements, and a demographic, an age, and a sex;

computer code for identifying, by the system, additional information specified for each of the plurality of advertisements, the additional information including:

data to be included in the advertisement, and at least one service provider to distribute the advertisement;

computer code for creating, by the system, each of the advertisements according to the profile criteria and additional information specified for the advertisement, the advertisement being created in a format coinciding with a media to be used by the at least one service provider to distribute the advertisement;

computer code for identifying, by the system, a plurality of customers to which an electronic invoice for a good or service is to be delivered;

computer code for determining, by the system, a subset of the plurality of customers by comparing the profile criteria of each of the plurality of advertisements to a database of customer profiles associated with the plurality of customers where the subset of the plurality of customers includes customers with associated customer profiles that match each of the profile criteria, and where the subset of the plurality of customers is limited to a predetermined number of advertisements to be distributed specified by a business entity distributing advertisements in association with invoices; and for each of the customers in the subset:

computer code for including, by the system, the plurality of advertisements with the electronic invoice to be delivered to the customer, where each of the plurality of advertisements is electronic and includes a plurality of categories for selection by the customer, computer code for delivering, by a billing interface of the system, the electronic invoice and the included plurality of advertisements to the customer, computer code for tracking, by the system, an interaction with the included plurality of advertisements by the customer, and computer code for reporting, by the system, result data to an advertiser associated with the included plurality of advertisements, the result data including information regarding the included plurality of advertisements and the tracked interaction;

computer code for storing, by the system, in a personal advertisement repository, the plurality of advertisements delivered to the customers, the advertisements being stored according to customer such that each of the advertisements is stored in the personal advertisement repository in association with each of the customers to which the advertisement was delivered;

computer code for providing, in the personal advertisement repository, a reference to an advertiser for each of the advertisements stored therein for automatically replacing, by the system, each of the advertisements stored in the personal advertisement repository with a corresponding updated advertisement when received from the referenced advertiser; and computer code for, for each of the customers, creating, by the system, a directory page specific to the customer for repeated presentment thereof, the directory page including the advertisements stored in a respective personal advertisement repository according to the customer by category;

computer code for, for each of the customers, providing, by the system and via the billing interface of the system, a respective directory page specific to the customer, and responsive to selection by the customer of one or more of the advertisements through the director page, providing the selected one or more advertisements to the customer for viewing thereof.

5. A system, comprising:
a processor for:
identifying, by the system, profile criteria specified for each of a plurality of advertisements, where the profile criteria describes customers to which the plurality of advertisements are to be delivered, and where the profile criteria includes:
a location of use of at least one of a previously purchased good and service,
a physical location,
a predefined preference indicating a desire to receive one or more categories of advertisements and a desire to not receive one or more categories of advertisements, and
a demographic, an age, and a sex; identifying, by the system, additional information specified for each of the plurality of advertisements, the additional information including:
data to be included in the advertisement, and
at least one service provider to distribute the advertisement;
creating, by the system, each of the advertisements according to the profile criteria and additional information specified for the advertisement, the advertisement being created in a format coinciding with a media to be used by the at least one service provider to distribute the advertisement;
identifying, by the system, a plurality of customers to which an electronic invoice for a good or service is to be delivered;
determining, by the system, a subset of the plurality of customers by comparing the profile criteria of each of the plurality of advertisements to a database of customer profiles associated with the plurality of customers where the subset of the plurality of customers includes customers with associated customer profiles that match each of the profile criteria, and where the subset of the plurality of customers is limited to a predetermined number of advertisements to be distributed specified by a business entity distributing advertisements in association with invoices; and
for each of the customers in the subset:
including, by the system, the plurality of advertisements with the electronic invoice to be delivered to the customer, where each of the plurality of advertisements is electronic and includes a plurality of categories for selection by the customer,
delivering, by a billing interface of the system, the electronic invoice and the included plurality of advertisements to the customer,
tracking, by the system, an interaction with the included plurality of advertisements by the customer, and reporting, by the system, result data to an advertiser associated with the included plurality of advertisements, the result data including information regarding the included plurality of advertisements and the tracked interaction;
storing, by the system in a personal advertisement repository, the plurality of advertisements delivered to the customers, the advertisements being stored according to customer such that each of the advertisements is stored in the personal advertisement repository in association with each of the customers to which the advertisement was delivered;
providing, in the personal advertisement repository, a reference to an advertiser for each of the advertisements stored therein for automatically replacing, by the system, each of the advertisements stored in the personal advertisement repository with a corresponding updated advertisement when received from the referenced advertiser; and
for each of the customers, creating, by the system, a directory page for repeated resentment thereof, the directory page including the advertisements stored in a respective personal advertisement repository according to the customer by category;
for each of the customers, providing, by the system, and via the billing interface of the system, a respective directory page specific to the customer, and
responsive to selection by the customer of one or more of the advertisements through the directory page, providing the selected one or more advertisements to the customer for viewing thereof.

6. The method of claim 1, wherein a history of advertisement matches is identified for each of the customers in the subset and is utilized such that each customer of the subset is only delivered the plurality of advertisements a predetermined number of times.

7. The method of claim 3, wherein the information collected from the business entity includes metadata.

* * * * *